US 6,532,044 B1

(12) United States Patent
Conner et al.

(10) Patent No.: US 6,532,044 B1
(45) Date of Patent: Mar. 11, 2003

(54) ELECTRONIC PROJECTOR WITH EQUAL-LENGTH COLOR COMPONENT PATHS

(75) Inventors: Arlie R. Conner, Portland, OR (US); Bruce L. Cannon, Potrland, OR (US)

(73) Assignee: Corning Precision Lens, Incorporated, Corning, NY (US)

( * ) Notice: Subject to any disclaimer, the term of this patent is extended or adjusted under 35 U.S.C. 154(b) by 0 days.

(21) Appl. No.: 09/620,831

(22) Filed: Jul. 21, 2000

(51) Int. Cl.[7] ............................................. G02F 1/1335
(52) U.S. Cl. .................................. 349/5; 349/9; 353/31
(58) Field of Search ....................... 349/5, 8, 9; 353/31, 353/36, 37; 359/407

(56) References Cited

U.S. PATENT DOCUMENTS

| 5,327,270 | A |   | 7/1994 | Miyatake ...................... 359/63 |
| 5,798,819 | A | * | 8/1998 | Hattori et al. ................... 349/9 |
| 6,028,703 | A | * | 2/2000 | Sekine et al. ................. 359/487 |
| 6,067,128 | A | * | 5/2000 | Imai ................................ 349/8 |
| 6,219,111 | B1 | * | 4/2001 | Fukuda et al. .................. 349/5 |
| 6,273,567 | B1 | * | 8/2001 | Conner et al. ................ 353/20 |

* cited by examiner

Primary Examiner—Toan Ton
(74) Attorney, Agent, or Firm—Ipsolon LLP

(57) ABSTRACT

An electronic (e.g., LCD) projector combines multiple projection lens assemblies with equal color component optical path lengths to provide improved display images and a compact arrangement. In one implementation, the projector includes a successive pair of angled dichroic mirrors that fold the red and blue color components of light in opposed directions. The green color component of light passes through the dichroic mirrors toward a pixelated electronic light modulator, such as a liquid crystal display, and an associated projection lens assembly. The red and blue color components of light are each folded again to propagate parallel with the green color component toward a pixelated electronic light modulator, such as a liquid crystal display, and an associated projection lens assembly. The separate projection lens assemblies are arranged in a non-linear, close-packed arrangement to receive the color components of light.

12 Claims, 6 Drawing Sheets

Fig. 1 - Prior Art
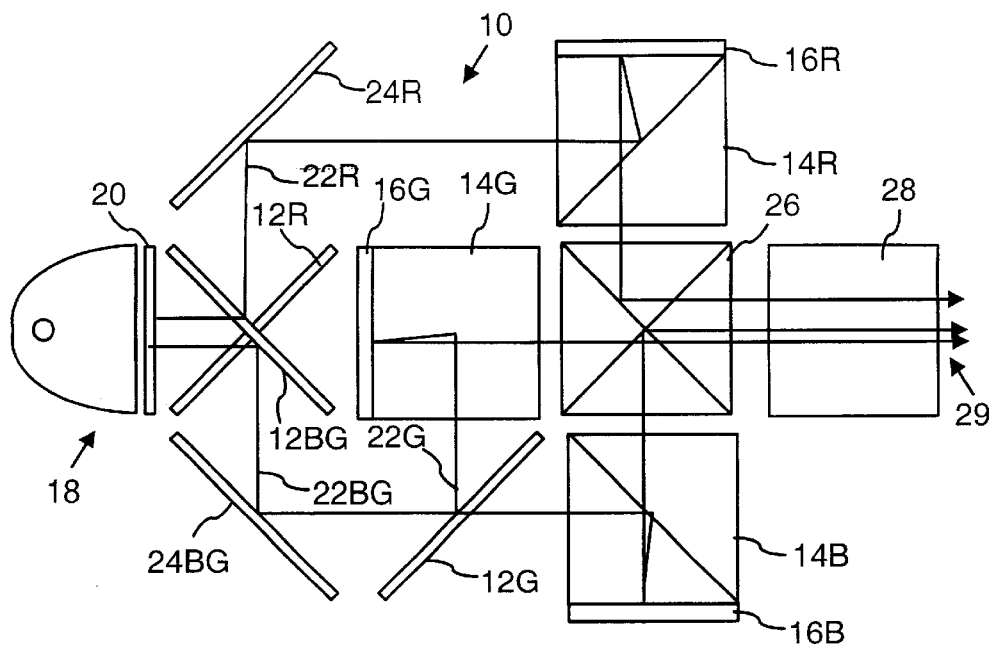
Fig. 2 - Prior Art
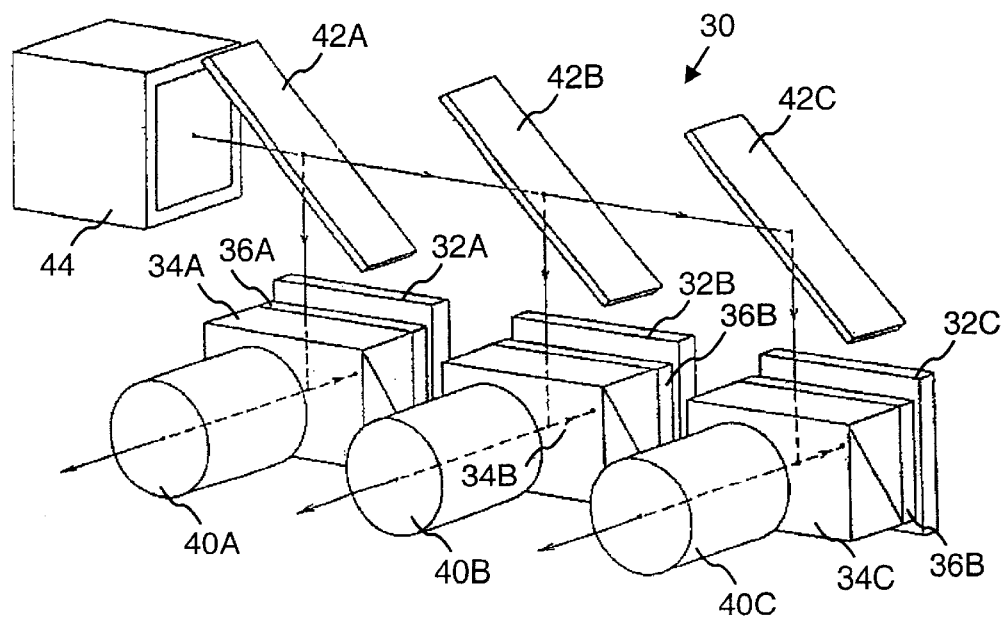

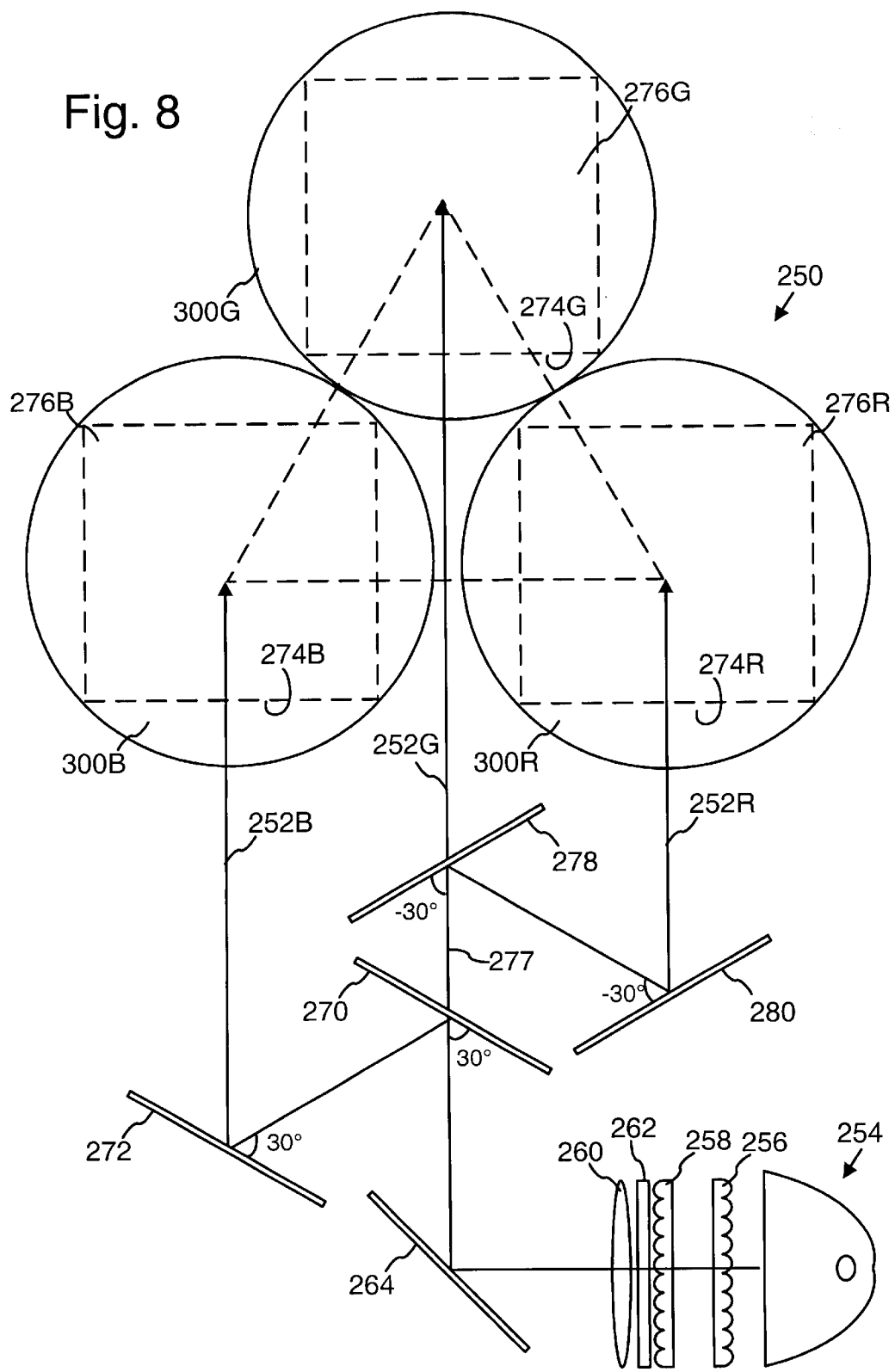

ELECTRONIC PROJECTOR WITH EQUAL-LENGTH COLOR COMPONENT PATHS

FIELD OF THE INVENTION

The present invention relates to color electronic (e.g., LCD) projectors and, in particular, to such a projector that includes equal-length color component paths and a separate projection lens assembly for each.

BACKGROUND AND SUMMARY OF THE INVENTION

Color electronic (e.g., liquid crystal display) projectors generate display images and project them onto display screens, typically for viewing by multiple persons or viewers. The display images may be formed by transmitting light from a high-intensity source of polychromatic or white light through or reflected from an image-forming medium such as a liquid crystal display (LCD).

FIG. 1 is a schematic diagram of a prior art multi-path reflective color liquid crystal display projection system 10 that utilizes color separating mirrors 12R, 12BG, and 12G in combination with polarization selective polarizing beam splitters 14R, 14G, and 14B and reflective liquid crystal displays 16R, 16G, and 16B.

Projection system 10 includes a light source 18 that directs white light through a polarizer (or polarization converter) 20 that provides polarized light to a pair of crossed dichroic mirrors 12R and 12BG. Dichroic mirror 12R reflects red light components along a red optical path 22R that is folded by an achromatic fold mirror 24R. Green and blue light passes through mirror 12R. Mirror 12BG reflects blue and green light components along a blue-green optical path 22BG that is folded by an achromatic fold mirror 24BG. Red light passes through mirror 12BG. Mirror 12G reflects green light components along a green optical path 22G and allows the blue light components to propagate along a blue optical path 22B. As a result, mirrors 12R, 12BG, and 12G cooperate to separate polarized red, green and blue light components and deliver them to polarizing beam splitters 14R, 14G, and 14B. The color component images are combined by an X-cube 26 and directed to a projection lens assembly 28.

Each polarizing beam splitter 14 includes a pair of right-angle prisms having their inclined faces positioned against each other with a polarization selective dielectric film (not shown) positioned therebetween. As is conventional for polarizing beam splitters, P-polarized light passes through the dielectric film and S-polarized light is reflected. S- and P-polarizations are conventional nomenclature referring to a pair of orthogonal linear polarization states in which, with regard to a polarization selective dielectric film, S-polarized light can be said to "glance" off the film and P-polarized light can be said to "pierce" the film. Polarizer 20 transmits the red, green and blue light components as predominantly S-polarized light, so nearly all the light received by polarizing beam splitters 14R, 14G, and 14B is reflected by the dielectric films to reflective liquid crystal displays 16R, 16G, and 16B.

In one implementation, reflective liquid crystal displays 16 are quarter wave-tuned (i.e., with 45°–60° twists) twisted nematic cells and reflect light from each pixel with a polarization that varies according to the control voltage applied to the pixel. For example, when no control voltage is applied (i.e., the pixel is in its relaxed state), the pixel imparts maximum (i.e., a quarter wave) phase retardation that results in a polarization rotation for suitably aligned polarized light. Each pixel imparts decreasing polarization rotation with increasing control voltage magnitudes until the pixel imparts no rotation (i.e., the pixel is isotropic).

In the relaxed state of a pixel, the polarization state is reversed when the light is reflected, so that the S-polarized light becomes P-polarized light. The P-polarized light then passes through the dielectric film of the polarizing beam splitter toward a crossed-combining prism 26 (also known as an X-cube) to be incorporated into the display image. With non-zero control voltages, the pixel reflects the light with corresponding proportions of P- and S-polarizations. Control voltages of greater magnitudes in this example cause greater portions of the light to be reflected with S-polarization, with all the reflected light having S-polarization at the greatest control voltage. The portion of the light with S-polarization is reflected by the dielectric films in polarizing beam splitters 14 back toward the illumination source and are not incorporated into the display image.

Such a multi-path reflective color liquid crystal display projection system 10 suffers from disadvantages that impair its imaging characteristics. One of crossed mirrors 12R and 12BG is actually formed with two mirror halves that are positioned behind and in front of the other of mirrors 12R and 12BG. Proper alignment of the mirror halves is very difficult and rarely achieved. As a consequence, the images reflected by the mirror halves are misaligned, which can result in readily discernible misalignments in the image halves. The relatively common misalignment between the mirror halves introduces, therefore, generally unacceptable image errors that may appear as de-coupled image halves that are improperly joined along an apparent seam.

Similarly, X-cube combiner 26 suffers from manufacturing limitations, such as an inability to perfectly form and join its components. In particular, such imperfections can arise at a central intersection region 29 where the X-cube components meet. Such imperfections are significant because they affect the central, most discernible region of an image.

FIG. 2 shows another prior light valve image projection system 30 as described in U.S. Pat. No. 5,327,270 of Miyatake. Projection system 30 includes three reflective liquid crystal panels 32A, 32B, and 32C that have corresponding polarizing beam splitters 34A, 34B, 34C, quarter wave plates 36A, 36B, 36C, and projection lenses 40A, 40B, 40C, respectively. Dichroic mirrors 42A, 42B, 42C color separate the light from a light source 44.

Color separation by successive dichroic mirrors 42A, 42B, 42C eliminates image errors and artifacts that can be introduced by crossed mirrors 12R, 12BG in projection system 10. Also, separate projection lenses 40A, 40B, 40C eliminate the image errors and artifacts that can be introduced by X-cube 26. To achieve such results, however, projection system 30 employs an in-line arrangement that is bulky and creates optical paths of different lengths for the different color components. The in-line arrangement of projection lenses 40A, 40B, 40C creates relatively large separations between them, thereby imposing relatively large convergence angles that can introduce color component misalignments at the display screen.

Moreover, different path lengths are disadvantageous because the differences causes different magnifications of the 'illumination pattern' onto each of the three color channels. When different color channels receive illumination patterns of different magnifications, (e.g., if R illumination is bigger than G and B illumination) the intensity uniformity profiles will be different, and it will be difficult to achieve a uniform white field by superposition.

In accordance with the present invention, an electronic (e.g., LCD) projector combines multiple projection lens assemblies with equal color component optical path lengths to provide improved display images and a compact arrangement. In one implementation, the projector includes a successive pair of angled dichroic mirrors that fold the red and blue color components of light in opposed directions. The green color component of light passes through the dichroic mirrors toward a pixelated electronic light modulator, such as a liquid crystal display, and an associated projection lens assembly. The red and blue color components of light are each folded again to propagate parallel with the green color component toward a pixelated electronic light modulator, such as a liquid crystal display, and an associated projection lens assembly. The separate projection lens assemblies are arranged in a non-linear, close-packed arrangement to receive the color components of light.

The equal lengths of the color component optical paths allow uniform magnifications of the 'illumination pattern' onto each of the three color channels. As a result, the color channels receive illumination patterns with generally the same intensity uniformity profiles and in superposition provide a white field with improved uniformity.

In addition, the non-linear, close-packed arrangement of the projection lens assemblies create minimal separations between them, thereby minimizing convergence angles and color component misalignments at the display screen. For example, projection lenses have imperfections in light transmission, especially vignetting or so-called relative illumination deviations, for portions of imaging fields that are away from the lens centers. The minimal separations between projection lens assemblies provided by this invention minimize image defects that can result from such imperfections and provide optimal uniformity and focus and minimal geometric distortion at the final image plane (i.e., the display screen).

Additional objects and advantages of the present invention will be apparent from the detailed description of the preferred embodiment thereof, which proceeds with reference to the accompanying drawings.

BRIEF DESCRIPTION OF THE DRAWINGS

FIG. 1 is a schematic diagram of a prior art multi-path reflective color liquid crystal display projection system.

FIG. 2 is a schematic diagram of another prior art multi-path reflective color liquid crystal display projection system.

FIG. 8 is a diagrammatic top view of a transmissive color electronic projection system with multiple equal-length color component light paths.

DETAILED DESCRIPTION OF PREFERRED EMBODIMENTS

Figure 3:
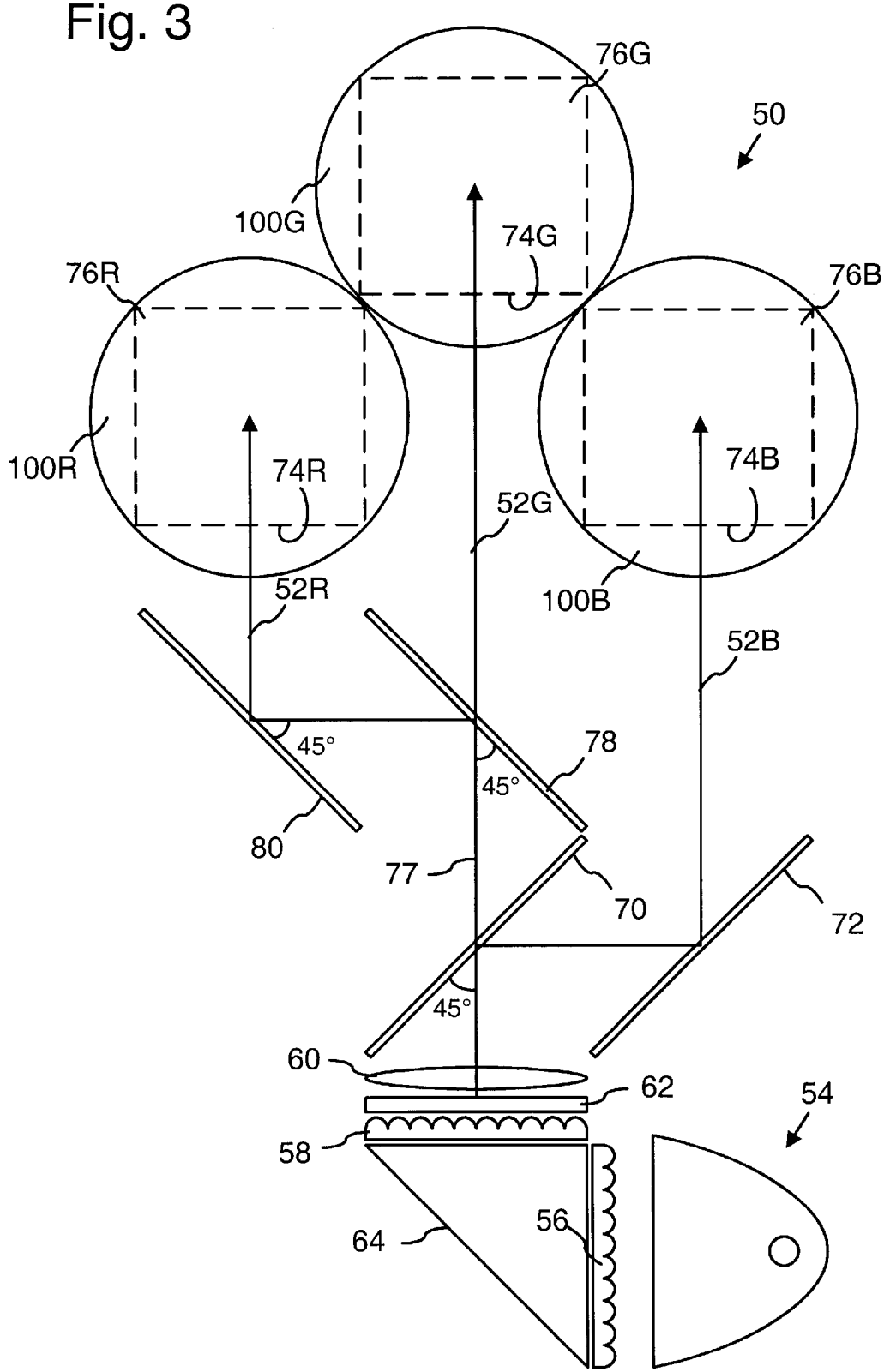
FIG. 3 is a diagrammatic top view of a reflective color electronic projection system with multiple equal-length color component light paths according to the present invention.

FIG. 3 is a diagrammatic top view of a reflective color electronic (e.g., liquid crystal display) projection system 50 with multiple equal-length color component light paths 52R, 52G, and 52B according to the present invention. A generally white light source 54 (e.g., a metal halide arc lamp and a concave concentrating reflector) directs light through a pair of microlens arrays 56 and 58 and a condenser lens 60. Microlens arrays 56 and 58 cooperate to provide multiple integrating images of light source 54 for increased image uniformity. A polarization converter 62 provides generally lossless polarization (e.g., S-polarization) of the light. Polarization converter 62 may be of a conventional type known in the art or as described in U.S. Pat. No. 5,973,833, which is assigned to the assignee of the present invention. A fold reflector 64 (e.g., a prism) is positioned between microlens arrays 56 and 58 to compactly provide a separation between them.

A first angled dichroic mirror 70 reflects either the blue or the red color component of light (e.g., blue light) along optical path 52B and passes the other two color components of light (e.g., green and red). Color component (e.g., blue) light from dichroic mirror 70 is reflected to an angled mirror 72 (e.g., achromatic) that folds optical path 52B toward a face 74B of a polarizing beamsplitter 76B.

A second angled dichroic mirror 78 reflects the other of the blue and red color component of light (e.g., red light) along optical path 52R and passes the remaining color component of light (i.e., green). Color component (e.g., red) light from dichroic mirror 78 is reflected to an angled mirror 80, (e.g., achromatic) that folds optical path 52R toward a face 74R of a polarizing beamsplitter 76R. In the illustrated implementation, dichroic mirrors 70 and 78 are each oriented at angles of incidence of about 45° relative to a central optical axis 77. Dichroic mirrors 70 and 78 reflect color components of light at the ends of the primary color spectrum in opposed directions. The remaining color component of light (i.e., green) passes to a face 74G of a polarizing beamsplitter 74G.

Figure 4:
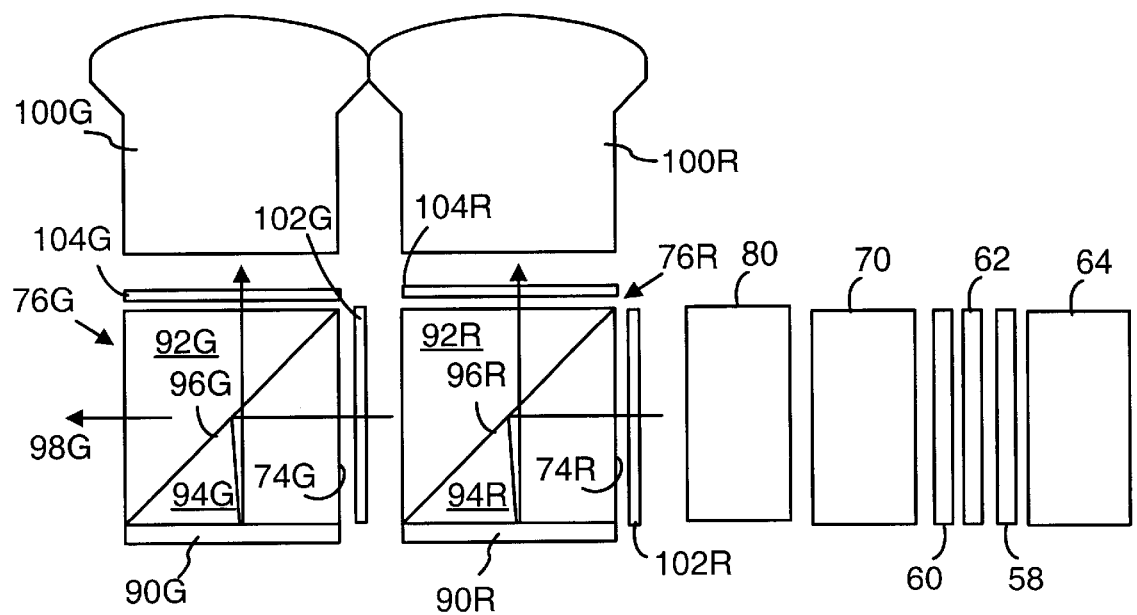
FIG. 4 is a diagrammatic side view of the projection system of FIG. 3.

With reference to FIG. 4, which is a diagrammatic side view illustrating a portion of projection system 50, each polarizing beamsplitter 76 (only polarization beamsplitters 76G and 76B shown) has adjacent one its faces face a reflective pixelated electronic display, such as a quarter wave-tuned reflective liquid crystal display 90. The following description is directed to polarization beamsplitter 76G, but is similarly applicable to polarization beamsplitters 76B and 76R, in one implementation.

Polarizing beam splitter 76G includes a pair of right-angle prisms 92G and 94G having their respective inclined faces positioned against each other with a dielectric film 96G therebetween. Dielectric film 96G is polarization selective and may be achromatic or color-tuned which, in the latter implementation, transmits all color component light other than green, regardless of polarization, while polarizing beam splitter 76G functions as a conventional polarizing beam splitter for green light.

Accordingly, polarizing beam splitter 76G reflects a selected polarization (e.g., S-polarized) green light toward reflective electronic optical modulator, such as a liquid crystal display 90G. Incidental P-polarized green light passes out of polarizing beam splitter 76G in a direction 98G and is discarded as potential illumination contamination. With a color-tuned dielectric film, any incidental non-green light (i.e. red or blue light) also passes out of polarizing beam splitter 76G in direction 98G and is discarded. In the illustrated implementation, polarization converter 62 transmits predominantly S-polarized light, so nearly all the green light received by polarizing beam splitter 76G is reflected to reflective liquid crystal display 90G.

It will be appreciated that dielectric film 96R of polarizing beam splitter 76R, for example, need not be formed specifically to pass incidental blue light, but rather can be formed with the blue spectral performance as a 'don't care' zone. In general a don't care zone will have poor or incidental optical performance for a selected spectral band, but will not cause display artifacts because there is no illumination energy corresponding to that band. In this regard, dielectric film 96R may be considered achromatic whether it actually transmits all wavelengths other than the band of interest or includes a don't care zone. Analogously, a color filter (e.g., red) may optionally be positioned to pass only that light band to the corresponding polarizing beam splitter (e.g., 76R), so that optical performance of dielectric film 96R for all other wavelengths can be don't care zones.

Reflective liquid crystal display 90G is a quarter wave-tuned twisted nematic cell that reflects light from each pixel with a polarization that varies according to the control voltage applied to the pixel. Hence, liquid crystal display 90G imparts image information on the color components of light. In one implementation, liquid crystal display 90G is formed on a silicon backplane, as is known in the exemplary art of CMOS transistor pixel arrays used in reflective panels. For example, the pixel in its relaxed state may have quarter wave retardation and maximum polarization rotation and may have decreasing polarization rotation with increasing control voltage magnitudes up to a maximum control voltage magnitude at which the pixel is isotropic and imparts no polarization rotation.

In the relaxed state, the polarization state is reversed when the light is reflected, so that the S-polarized light becomes P-polarized light. The P-polarized light then passes through the dielectric film 96G of the polarizing beam splitter 76G toward a projection lens assembly 100G to be projected to a display screen (not shown). With non-zero control voltages, the pixel reflects the light with corresponding proportions of P- and S-polarizations. Greater control voltages in this example cause greater portions of the light to be reflected with S-polarization. The portion of the light with S-polarization is reflected by the dielectric films in polarizing beam splitter 76G back toward the illumination source and is not incorporated into the display image. As a result, polarizing beam splitter 76G functions to analyze the image information imparted on the light by liquid crystal display 90G.

Some incidental P-polarized light entering polarizing beam splitter 76G may sometimes be reflected at dielectric film 96G toward reflective liquid crystal display 90G, rather than passing through dielectric film 96G as is desired. This P-polarized light can degrade image contrast when the P-polarized light is reflected from liquid crystal display 90G, passes back through dielectric film 96G, and is incorporated into the display image. It is believed that the reflection of such P-polarized light occurs when the light has an angle of incidence that deviates from a preferred normal angle, but other causes are possible. To prevent such image contrast degradation that can be caused by such P-polarized light, a linear polarizing filter 102G (e.g., a stretched and dyed or iodine-type) can optionally be positioned to block P-polarized light directed toward polarizing beam splitter 76G. To further enhance image contrast, another polarizing film 104G, such as a dichroic dyed and stretched polyvinyl alcohol (PVA) type, can be positioned between polarizing beam splitter 76G and projection lens assembly 100G to block light other than P-polarized green light.

Projection lens assemblies 100G, 100B, 100R project color component images to a display screen (not shown) where they are combined into a multiple (e.g., full) color image. To provide adequate convergence of the color component images, electronic projection system 50 would typically be employed in a rear projection display system with a transmissive display screen, of the type known in the art. In such applications, convergence of projection lens assemblies 100G, 100B, 100R may be fixedly established during manufacture. In contrast, a front projection display system with a reflective display screen would require convergence adjusts between projection lens assemblies 100G, 100B, 100R according to the projection distance. Such adjustments could be practicable for fixed front projection applications.

Figure 5:
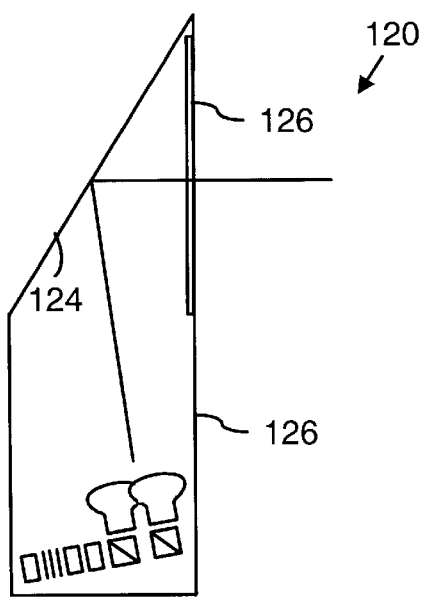
FIG. 5 is a diagrammatic side view of a rear projection display the projection system of FIG. 3.

FIG. 5 is a diagrammatic side view of a rear projection display system 120 illustrating an exemplary application of projection system 50. Rear projection display system 120 includes projection system 50 within a cabinet or housing 122 together with a mirror 124 and a transmissive display screen 126, as are known in the art.

In the implementation illustrated in FIG. 3, projection lens assemblies 100G, 100B, 100R include a close-packed arrangement in which projection lens assembly 100G is positioned between, and out-of-line with projection lens assemblies 100B and 100R. The close-packed arrangement facilitates convergence of the color components images at the display screen by minimizing the initial separation of the images. For example, with each projection lens assembly 100 having a cylindrical assembly with a diameter D, the center of projection lens assembly 100G can be separated from the centers of projection lens assemblies 100B and 100R by offsets X and Y of about:

$$X = Y = \pm \frac{\sqrt{2}}{2} D$$

Dichroic mirrors 70 and 78 cooperate with fold mirrors 72 and 80 to provide optical paths 52B and 52R to polarizing beam splitters 76B and 76R with lengths that are the same as the length of optical path 52G to polarizing beam splitter 76G. The equal lengths of optical paths 52 provided by electronic projection system 50 allow identical optical and mechanical components to be used in each path to reduce cost and improve manufacturing process flow. Additionally, the equal paths allow uniform magnifications of the 'illumination pattern' onto each of the three color channels. As a result, the color channels receive illumination patterns with generally the same intensity uniformity profiles and in superposition provide a white field with improved uniformity. Moreover, such uniformity allows liquid crystal displays 90 to be illuminated with only about 5–10 percent overfill, which is significantly less than is conventionally required and provides improved display brightness.

Another aspect of projection system 50 is that all three colors channels are of the same "handedness," so that no color channel has an 'illumination pattern' that is a right-left transposition relative to another. This means if there is a 'hot spot' on the left side of one color channel imaging device (e.g., red due to some defect of the illumination), the 'hot spot' will also appear in the same location on the left sides of the other color channel imaging devices (e.g., blue and green). This kind of handedness symmetry is generally not possible in 3-channel color synthesizing systems because the decomposition of the white light into 3 distinct color paths is usually not a symmetric and equal path-length process. As a consequence, other systems might have a reddish tinge on one edge and a consequent blue-green tinge on the opposing edge of the displayed image. Or a yellowish upper left corner and a bluish lower right corner, for example.

Furthermore, conventional reflective optical architectures typically require a path length between the imager (e.g., LCD) and the projection lens assembly that is twice that required by the present invention to accommodate a combiner of the different color channels. Such a longer path length requires that the projection lens assembly in conventional reflective optical architectures have a longer back working distance, which can cause such a projection lens assembly to be more difficult to design, have poorer performance, be more complex, have more elements and be bulkier and costlier. The shorter path length provided by the present infention avoids these shortcomings.

Figure 6:
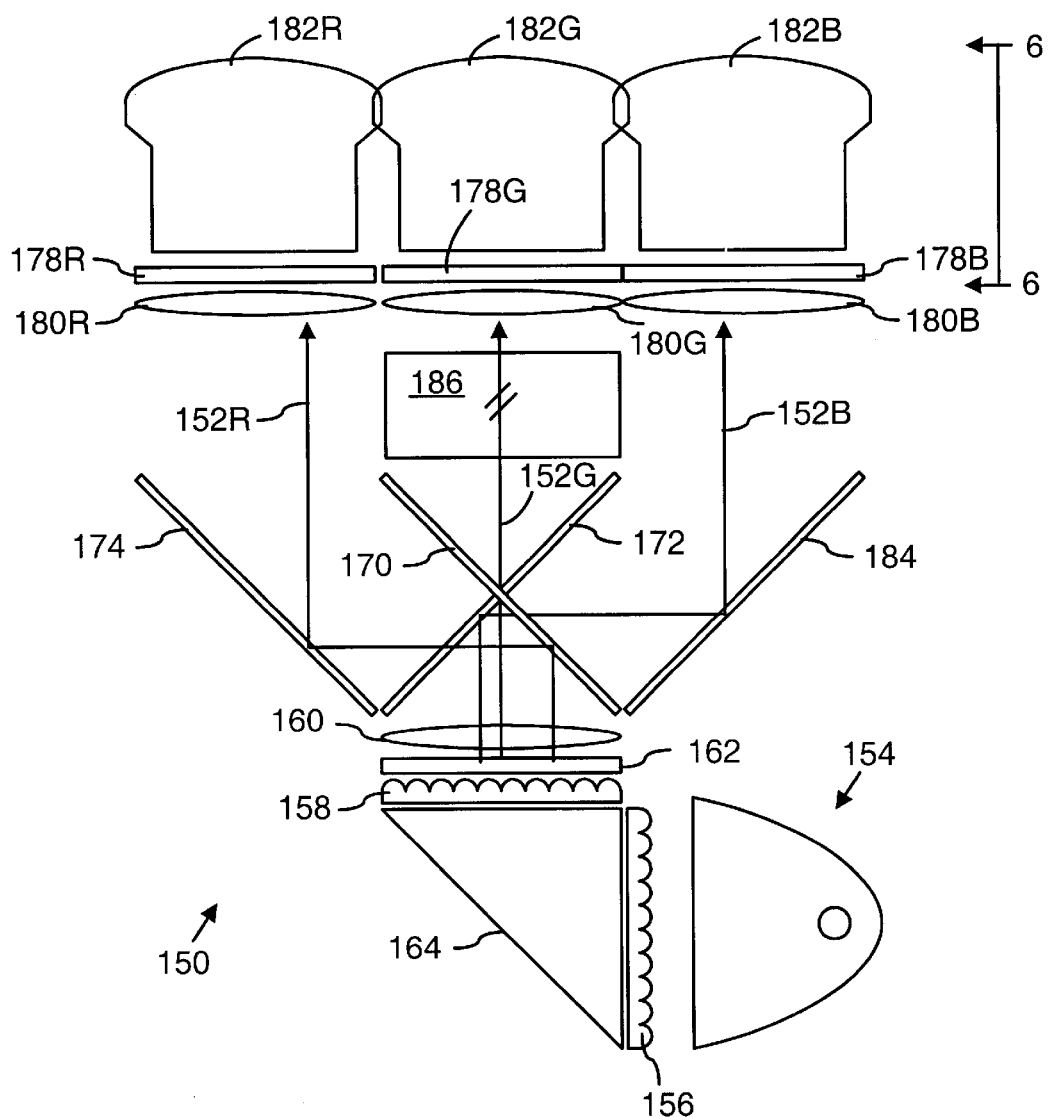
FIG. 6 is a diagrammatic rear view of a transmissive color electronic projection system with multiple equal-length color component light paths according to the present invention.

FIG. 6 is a diagrammatic rear view of a transmissive color electronic (e.g., liquid crystal display) projection system 150 with multiple equal-length color component light paths 152R, 152G, and 152B according to the present invention. A generally white light source 154 (e.g., a metal halide arc lamp and a concave concentrating reflector) directs light through a pair of microlens arrays 156 and 158 and a condenser lens 160. Microlens arrays 156 and 158 cooperate to provide multiple integrating images of light source 154 for increased image uniformity. A polarization converter 162 provides generally lossless polarization (e.g., S-polarization) of the light. Polarization converter 162 may be of a conventional type known in the art or as described in U.S. Pat. No. 5,973,833, which is assigned to the assignee of the present invention. A fold reflector 164 (e.g., a prism) is positioned between microlens arrays 156 and 158 to compactly provide a separation between them.

A pair of crossed dichroic mirrors 170 and 172 reflect the red and blue color components of light along optical paths 152R and 152B and pass the remaining color component of light (i.e., green). The red color component of light from dichroic mirror 170 is reflected to an angled mirror 174 (e.g., achromatic) that fold optical path 152R toward a transmissive electronic pixelated display, such as a liquid crystal display 178R, and its associated field lens 180R and projection lens assembly 182R. The blue color component of light from dichroic mirror 172 is reflected to an angled mirror 184 (e.g., achromatic) that fold optical path 152B toward a transmissive electronic pixelated display, such as a liquid crystal display 178B, and its associated field lens 180B and projection lens assembly 182B.

Figure 7:
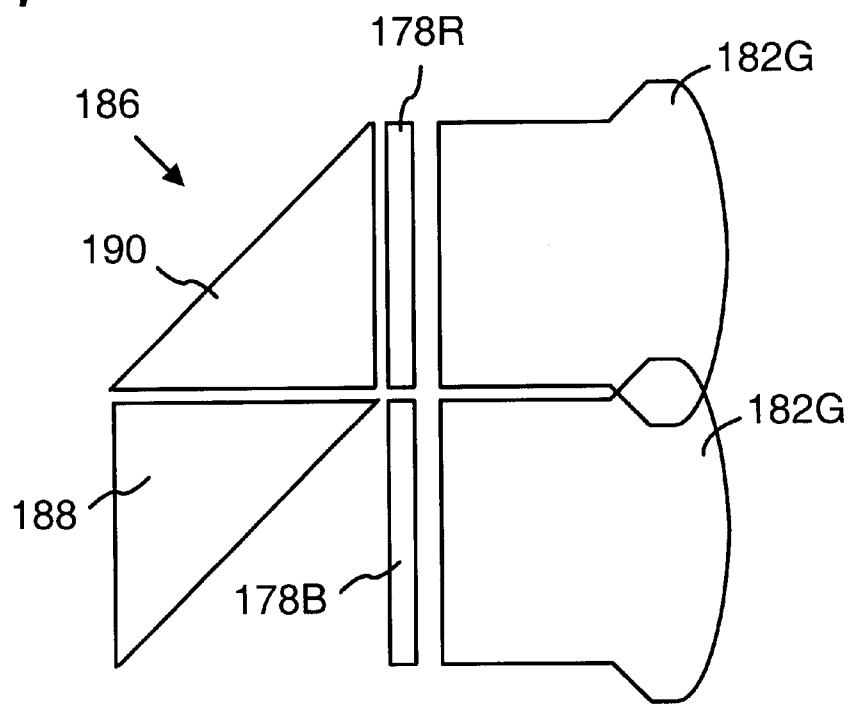
FIG. 7 is a diagrammatic side view illustrating a portion of the projection system of FIG. 6.

With reference to FIG. 7, which is a diagrammatic side view illustrating a portion of projection system 150, the green color component propagates to a periscopic assembly 186 that has a pair of fold reflectors 188 and 190 (e.g., right-angle prisms) and shifts optical path 152G out of a line or plane formed by optical paths 152R and 152B. Periscopic assembly 186 functions to shift optical path 152G by a distance that matches the distance between mirror pairs 170, 174 and 172,184, thereby providing all of optical paths 152 with the same length.

FIG. 8 is a diagrammatic top view of a transmissive color electronic (e.g., liquid crystal display) projection system 250 with multiple equal-length color component light paths 252R, 252G, and 252B according to the present invention. A generally white light source 254 (e.g., a metal halide arc lamp and a concave/parabolic concentrating reflector) directs light through a pair of microlens arrays 256 and 258 and a condenser lens 260. Microlens arrays 256 and 258 cooperate to provide multiple integrating images of light source 254 for increased image uniformity. A polarization converter 262 provides generally lossless polarization (e.g., S-polarization) of the light. A fold reflector 264 is positioned after condenser lens 260.

A first angled dichroic mirror 270 reflects either the blue or the red color component of light (e.g., blue light) along optical path 252B and passes the other two color components of light (e.g., green and red). Color component (e.g., blue) light from dichroic mirror 270 is reflected to an angled mirror 272 (e.g., achromatic) that folds optical path 252B toward a face 274B of a polarizing beamsplitter 276B.

A second angled dichroic mirror 278 reflects the other of the blue and red color component of light (e.g., red light) along optical path 252R and passes the remaining color component of light (i.e., green). Color component (e.g., red) light from dichroic mirror 278 is reflected to an angled mirror 280 (e.g., achromatic) that folds optical path 252R toward a face 274R of a polarizing beamsplitter 276R. Dichroic mirrors 270 and 278 reflect color components of light at the ends of the primary color spectrum in opposed directions. The remaining color component of light (i.e., green) passes to a face 274G of a polarizing beamsplitter 274G. Projection system 250 includes polarizing beamsplitters 276 and projection lens assemblies 300 that are substantially the same as polarizing beamsplitters 76 and projection lens assemblies 100

Dichroic mirrors 270 and 278 are each oriented at angles of incidence of about 30° relative to a central optical axis 277. Similarly, mirrors 272 and 280 are oriented to provide angles of incidence of about 30°. The orientations of mirrors 270, 272, 278, and 280 allow polarizing beamsplitters 276 and projection lens assemblies 300 to be positioned with the centers of projection lens assemblies 300 defining an equilateral triangle arrangement. The equilateral triangle arrangement projection lens assemblies 300 provide a closest-packed arrangement, which maximizes the benefits described above with reference to projection system 50. In addition, the 30° angles of incidence of mirrors 270 and 278 provide improved color separation performance relative to color separating dichroic mirrors oriented at 45° angles of incidence.

In view of the many possible embodiments to which the principles of our invention may be applied, it should be recognized that the detailed embodiments are illustrative only and should not be taken as limiting the scope of our invention. Rather, the invention includes all such embodiments as may come within the scope and spirit of the following claims and equivalents thereto.

What is claimed is:

1. In a multi-path reflective pixelated display projector having a light source providing multi-color light, plural reflective pixelated displays for imparting image information on color components of the light, the color components of light propagating along separate optical paths, and plural polarizing beam splitters associated with the reflective pixelated displays for analyzing image information imparted by the reflective pixelated displays, the improvement comprising:

equal path lengths for the separate optical paths of the color components of light; and a projection lens assembly for each of the color components of light, the projection lens assemblies being in a non-linear-arrangement with each other.

2. The projector of claim 1 further comprising:

first and second dichroic mirrors that reflect respective first and second color components of light in opposed directions and transmit at least one other color component of light; and first an second fold mirrors that are generally parallel to the respective first and second dichroic mirrors to direct the first and second color components of light in a direction generally parallel to that of the at least one other color component of light transmitted by the dichroic mirrors.

3. The projector of claim 2 in which light propagates to the first and second dichroic mirrors at an angle of incidence of about 45°.

4. The projector of claim 2 in which light propagates to the first and second dichroic mirrors at an angle of incidence of about 30°.

5. The projector of claim 1 in which the pixelated displays are liquid crystal displays.

6. The projector of claim 1 in which the color components of light are red, green and blue, and in which the projection lens assembly for the green color component of light is positioned between and out-of-line with the projection lens assemblies for the red and blue color components of light.

7. In a multi-path pixelated display projector having a light source providing multi-color light, plural pixelated displays for imparting image information on color components of the light, the color components of light propagating along separate optical paths to the pixelated displays for analyzing image information imparted by the pixelated displays, the improvement comprising:

equal path lengths for the separate optical paths of the color components of light; and a projection lens assembly for each of the color components of light, the projection lens assemblies being in a non-linear arrangement with each other.

8. The projector of claim 7 in which the pixelated displays are transmissive pixilated displays.

9. The projector of claim 7 in which the pixelated displays are liquid crystal displays.

10. The projector of claim 7 further comprising first and second dichroic mirrors that reflect respective first and second color components of light in opposed directions and transmit at least one other color component of light.

11. The projector of claim 10 in which light propagates to the first and second dichroic mirrors at an angle of incidence of about 30°.

12. The projector of claim 7 in which the color components of light are red, green and blue, and in which the projection lens assembly for the green color component of light is positioned between and out-of-line with the projection lens assemblies for the red and blue color components of light.

* * * * *

UNITED STATES PATENT AND TRADEMARK OFFICE
CERTIFICATE OF CORRECTION

PATENT NO. : 6,532,044 B1
DATED : March 11, 2003
INVENTOR(S) : Cannon, Bruce L.

It is certified that error appears in the above-identified patent and that said Letters Patent is hereby corrected as shown below:

Title page,
Item [75], Inventors, delete "Potrland" and insert in place thereof -- Portland --.

Column 3,
Line 58, delete "display the" and insert in place thereof -- display of the --.

Column 4,
Line 45, delete "its faces face" and insert in place thereof -- of its faces --.

Column 6,
Line 15, delete "adjusts" and insert in place thereof -- adjustments --.

Column 7,
Line 18, delete "infention" and insert in place thereof -- invention --.

Column 9,
Line 6, delete "first an second" and insert in place thereof -- first and second --.

Signed and Sealed this

Twelfth Day of October, 2004

JON W. DUDAS
*Director of the United States Patent and Trademark Office*